United States Patent
Naumann

(10) Patent No.: US 10,005,201 B2
(45) Date of Patent: Jun. 26, 2018

(54) ROTATION DEVICE FOR ROTATIONALLY MOULDED MOLDINGS

(71) Applicant: ROTO evolution GmbH, Crimmitschau (DE)

(72) Inventor: Frank Naumann, Vollmershain (DE)

(73) Assignee: Roto Evolution GmbH, Crimmitschau (DE)

( * ) Notice: Subject to any disclaimer, the term of this patent is extended or adjusted under 35 U.S.C. 154(b) by 546 days.

(21) Appl. No.: 14/411,696

(22) PCT Filed: Jun. 29, 2013

(86) PCT No.: PCT/DE2013/000339
§ 371 (c)(1),
(2) Date: May 21, 2015

(87) PCT Pub. No.: WO2014/000727
PCT Pub. Date: Jan. 3, 2014

(65) Prior Publication Data
US 2016/0039114 A1     Feb. 11, 2016

(30) Foreign Application Priority Data
Jun. 30, 2012   (DE) .................... 10 2012 012 954

(51) Int. Cl.
| | | |
|---|---|---|
| *B29C 41/04* | (2006.01) | |
| *B28B 1/20* | (2006.01) | |
| *B29C 33/30* | (2006.01) | |
| *B29C 41/34* | (2006.01) | |
| *B28B 7/00* | (2006.01) | |
| *B28B 7/34* | (2006.01) | |

(52) U.S. Cl.
CPC ............... *B28B 1/20* (2013.01); *B28B 7/002* (2013.01); *B28B 7/342* (2013.01); *B29C 33/30* (2013.01); *B29C 41/04* (2013.01); *B29C 41/34* (2013.01)

(58) Field of Classification Search
CPC ........ B29C 41/04; B29C 41/042; B29C 41/06
USPC .................................. 425/429, 430
See application file for complete search history.

(56) References Cited

U.S. PATENT DOCUMENTS
| | | |
|---|---|---|
| 2,946,092 A | 7/1960 | Yoder |
| 3,704,084 A | 11/1972 | Clay |

FOREIGN PATENT DOCUMENTS
WO       99/56930 A1    11/1999

*Primary Examiner* — Joseph S Del Sole
*Assistant Examiner* — Thu Khanh T Nguyen
(74) *Attorney, Agent, or Firm* — Hodgson Russ LLP

(57) ABSTRACT

A rotation apparatus for rotationally molded shaped objects includes a receiving apparatus for receiving at least one negative mold, a holding apparatus for holding the receiving apparatus, and a drive unit for driving rotary motion of the receiving apparatus, wherein the receiving apparatus (1) is embodied as a sphere. The holding apparatus includes at least one support and guidance element (5) for supporting and guiding the receiving apparatus. The drive unit includes a drive element (9) that is arranged in the rotation apparatus and is connected in energy-transferring fashion to the receiving apparatus (1) to cause the sphere to rotate.

11 Claims, 3 Drawing Sheets

ROTATION DEVICE FOR ROTATIONALLY MOULDED MOLDINGS

CROSS-REFERENCE TO RELATED APPLICATIONS

Figure 1:
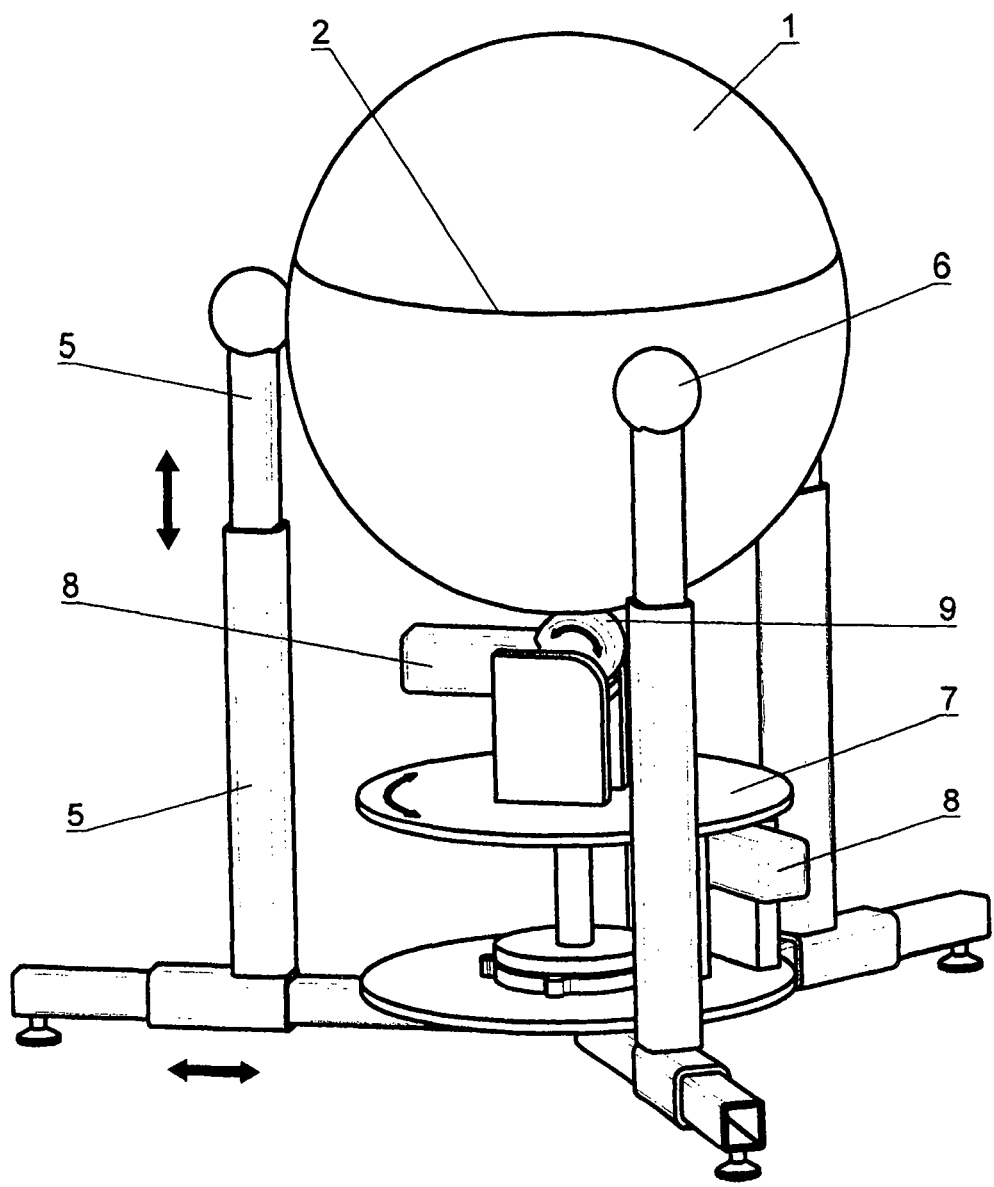

The present application is the U.S. national phase of International Application No. PCT/DE2013/000339 filed Jun. 29, 2013, which claims priority of German Application No. 10 2012 012 954.8 filed Jun. 30, 2012, the entirety of which is incorporated herein by reference.

FIELD OF THE INVENTION

The invention relates to a rotation apparatus for the manufacture of rotationally molded shaped objects, made up of a receiving apparatus for the mold, a holding apparatus for the mold, and a drive unit for rotary motion, as is required for the production of individual rotationally molded shaped objects using a cold method, e.g. from cement-bound materials (concrete) or clay, or using a hot method from plastic, synthetic resin, and special mixtures.

BACKGROUND OF THE INVENTION

Conventional rotational molding units are made up of a rotating arm on one or both ends of which the receiving apparatus for the mold is arranged. All-axis rotation of the mold is produced with the aid of the rotary motion of the rotary arm and the additional rotary motion of the holding apparatus for the receiving apparatus.

Such designs require a great deal of space, since the pivot radius of the rotary arm determines the dimension of the mold but also the dimensioning of the unit. The costs of such units are therefore suitable only for larger production volumes. In addition, a considerable energy expenditure is required for moving the mold by way of the pivot arm.

SUMMARY OF THE INVENTION

The object of the invention is to create a rotational molding unit that overcomes the disadvantages of the existing art and operates with greater energy efficiency as compared with the existing art. The intention is to achieve the capability for a rapid and economical change in product line for serially manufactured products, but also a capability for manufacturing individual production runs.

According to the present invention the object is achieved by the features and advantageous embodiments described in the present specification.

In accordance therewith, a rotation apparatus for rotationally molded shaped parts is made up of a receiving apparatus for at least one mold, said receiving apparatus for at least one mold being embodied according to the present invention as a sphere. The necessary holding apparatus for the spherical receiving apparatus for the molds is configured from at least one support and guidance element, and the spherical receiving apparatus is guided thereby. A drive element is connected in energy-transferring fashion to the spherical receiving apparatus and initiates rotation of the sphere.

This type of apparatus makes it possible to impart rotation to tool molds with minimal technical outlay. Made up of at least one tool receptacle having the outer contour of a sphere, and of a holding apparatus in which said sphere is caused to rotate by only one drive element.

In an advantageous variant, the holding apparatus for the spherical receiving apparatus for receiving the negative molds is embodied from at least three approximately vertically embodied support and guidance elements in the form of stands, which are in contact with the sphere via guidance mounts. Rotation of the sphere is assisted by the guidance mounts in that they are embodied, for example, as rolling bearings movable in all axes.

In order to ensure a comprehensive change in direction upon rotary motion of the sphere, the drive unit is embodied as a horizontally arranged turntable, driven by means of a motor, on which the drive element is arranged in the form of a drive wheel driven separately by means of a further motor, the drive wheel being in energy-transferring contact with the sphere in a manner causing rotary motion of the sphere.

With this solution, two energy engagement directions for initiating rotary motion are exerted simultaneously on the sphere, thereby ensuring that the sphere moves comprehensively in a very large number of rotation directions, thereby ensuring very good quality for the rotational molding. In order to allow the apparatus to be adjusted to different positions, sizes, and masses of the receiving apparatus, the support and guidance stands and/or the guidance mounts of the support and guidance stands are embodied in positionally modifiable fashion, and can thus be adjusted to the necessary position.

A further variant shows that the holding apparatus for the receiving apparatus is embodied as a shell-shaped holding apparatus, and the drive element is embodied as a separating and guiding medium placed under pressure. The separating and guiding medium is advantageously introduced by means of pressure, by means of at least one control nozzle, into the interstice between the shell surface and the surface of the spherical receiving apparatus. The shape of the shell surface of the holding apparatus and the curvature line of the sphere are embodied equivalently. A gaseous or liquid medium of suitable consistency and layer thickness is used as a separating and guiding medium. The control nozzle is controllable so that the change in direction of the sphere's rotary motion, and the rotation speed, can thereby be regulated.

This solution offers the advantage that rotation of the sphere can be obtained via an uncomplicated design for the rotation unit, and with only one control part. At the same time, the holding apparatus can be correspondingly equipped for heat transfer to the spherical receiving apparatus for the negative molds in the context of hot rotational methods.

The receiving apparatus embodied as a sphere advantageously comprises at least one separating plane so that the negative molds can be arranged in the receiving apparatus together with the molding material. The separating plane is, if necessary, embodied so that it is embodied sealingly with respect to the penetration of a medium.

Advantageously, the individual negative molds are each arranged in the region of the separating plane in a filling and shaping substance arranged in the spherical receiving apparatus, on either side of and likewise separated by the separating plane in terms of their shape.

The filling and shaping substance can be placed as an interchangeable insert into the spherical receiving apparatus segments, thus allowing economical and time-saving switchover to a new product line.

The possibility also exists of placing an interchangeable insert, with the reception of one or more negative molds and with the necessary molding material, into the filling and shaping substance into a compatible receptacle prefabricated therein. Both possibilities offer the advantage that everything can be prepared outside the rotation apparatus, and only the sphere needs to be replaced in each case.

Opening can thus occur in at least one separating plane, so that the receiving apparatus for the negative molds is made up, in the opened state, of at least two parts.

These parts must be held together during the rotation process by suitable means, for example magnetic closures.

These connecting elements must be located in the separating plane or on the intersection surfaces, and must not disrupt the outer contour of the sphere.

The shape of the rotation object to be created is introduced as a negative into the resulting intersection surfaces of the sphere, in consideration of the final molding direction, undercuts, quantity of material, center of gravity, etc.

The size of the sphere is critically dependent on the size, geometry, and weight of the rotationally molded object to be generated.

These recesses (negative mold) that are created are filled with the necessary quantity of material and connected to one another at the separating planes for the manufacturing time.

The mold is then caused to rotate on the sphere rotation unit, the material present in the mold being uniformly in contact against the wall of the negative mold.

The mold must remain rotating at least until the material has come into contact against the mold surfaces and is dimensionally stable.

The mold can then be removed from the spherical rotation unit and stored elsewhere until final completion (curing).

After completion, the sphere is opened at the separating planes and the molded object is removed. The manufacturing process can now begin again.

It is also possible for the filling and shaping substance itself to form, as a "lost" shell, the spherical receiving apparatus for the negative mold. For this, the filling and shaping substance must exhibit sufficient stability to withstand the rotation process as a spherical shape. The negative mold and the molding material can be incorporated concurrently upon manufacture of the sphere from filling and shaping substance, or the two are incorporated into the shaping substance subsequently using appropriate methods, such as the laser sintering method. After the rotation process, the spherical receiving apparatus is destroyed and the finished rotated shaped part can be removed.

This simple configuration of the rotation unit and rotation mold allows small quantities of rotationally molded objects to be manufactured economically.

The reduction in technical outlay as compared with conventional rotation units allows operating reliability to enhanced, and wear to be reduced to a minimum.

The simple combination of rotation unit and mold allows rapid mold changing with no mechanical complexity.

Rotational processing of materials that achieve dimensional stability with and without the delivery of heat, e.g. cement-bound materials, clay, plastic, synthetic resin, and special mixtures, etc., allows a considerable saving of energy costs and of resources.

The costs for mold production are appreciably reduced, since temperature-stable material such as aluminum or steel do not necessarily have to be used.

The solution will be explained in further detail below with reference to exemplifying embodiments.

BRIEF DESCRIPTION OF THE DRAWING VIEWS

Figure 2:
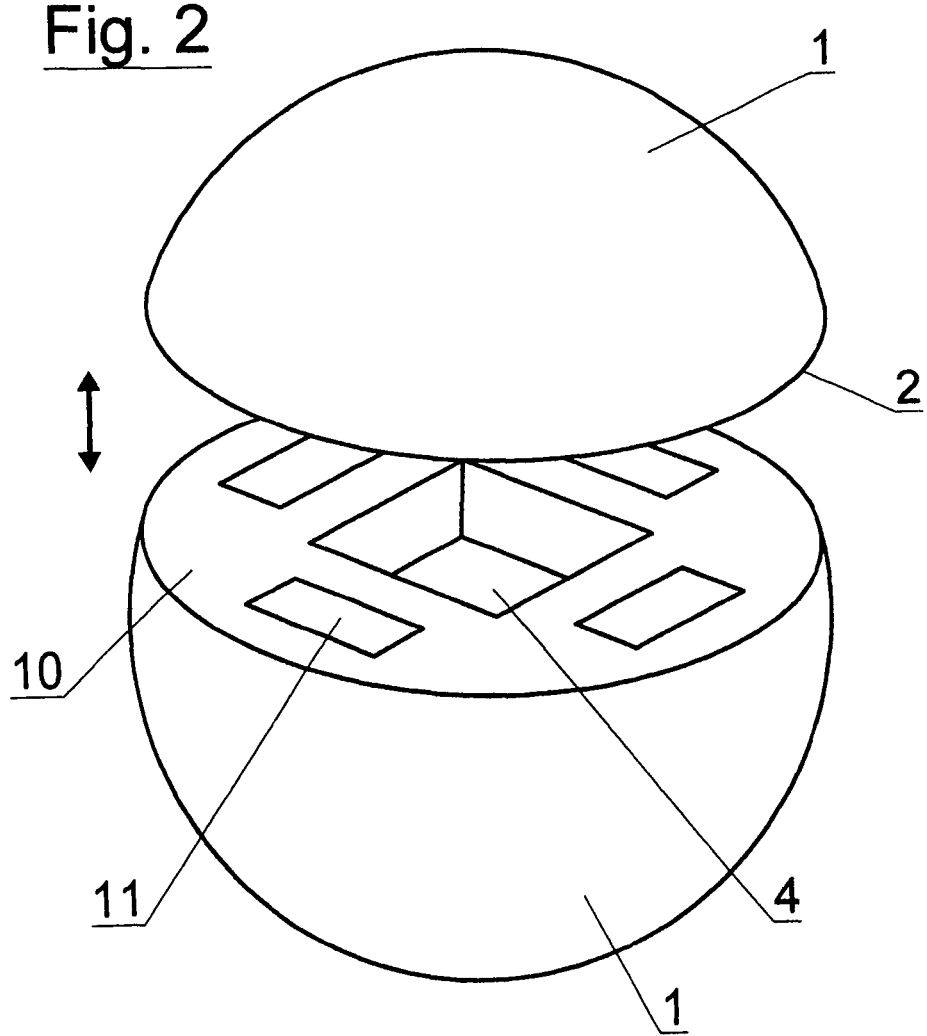
Figure 4:
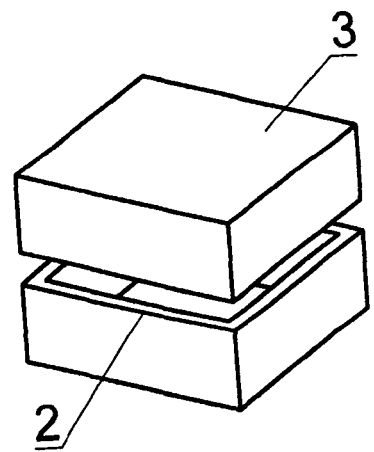
Figure 3:
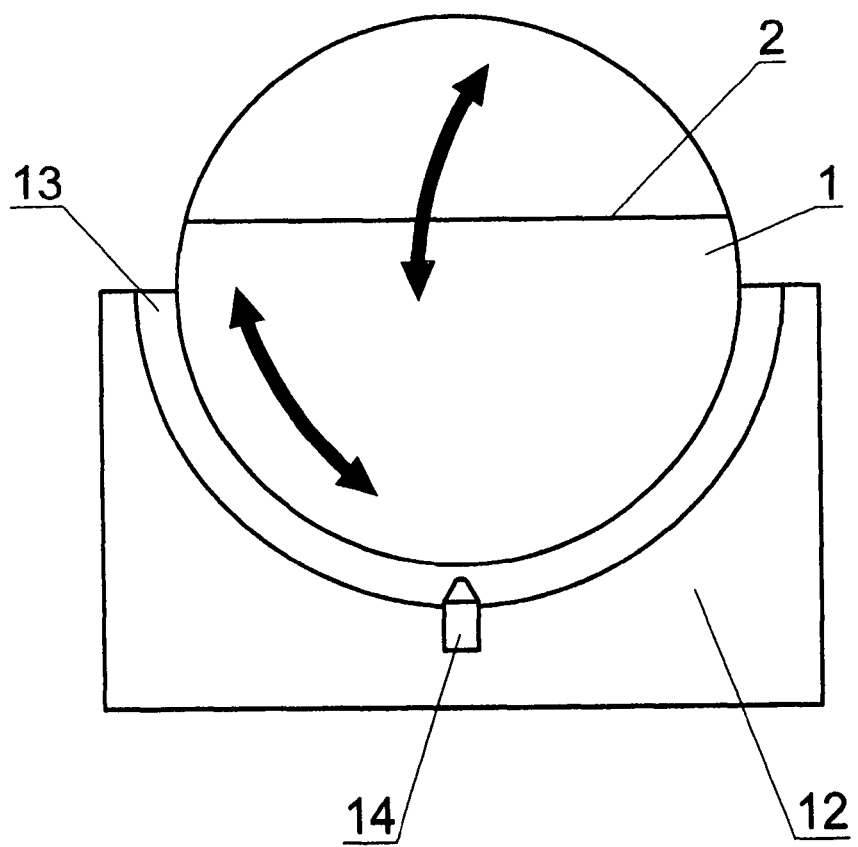

In the attached drawing:

FIG. 1 is a schematic view of a rotation apparatus having the spherical receiving apparatus 1, the three support and guidance elements 5 in the form of stands having guidance mounts 6, and drive element 9 made up of a turntable 7 and drive wheel;

FIG. 2 schematically depicts a receiving apparatus 1 having a recess for receiving negative molds 4, in the opened state, and the closing apparatuses;

FIG. 3 is a schematic view of a rotation apparatus having the spherical receiving apparatus 1, the shell-shaped holding apparatus 12 with the arrangement of control nozzles 14, and separating and guiding medium 13; and FIG. 4 schematically depicts an interchangeable insert 3 for receiving at least one negative mold and molding material.

DETAILED DESCRIPTION OF THE INVENTION

Exemplifying Embodiment 1

In accordance with FIGS. 1, 2, and 4, a rotation apparatus for manufacturing rotationally molded objects is made up of a receiving apparatus for the negative mold, a holding apparatus for the receiving apparatus, and a drive unit to ensure rotational motion. According to the present invention, receiving apparatus 1 is embodied, for receiving at least one negative mold 4, as a sphere. The holding apparatus for the spherical receiving apparatus 1 is made up of three approximately vertically configured stands that serve as support and guidance elements 5. Arranged on each of these, in the upper region, are respective guidance mounts 6 that advantageously are embodied as rolling bearings movable in all axes. The stands are in contact with the sphere with these guidance mounts 6, and thus assist the positioning and rotary motion of the sphere. The sphere is driven in terms of its rotary motion by way of drive element 9, which is made up of a drive wheel in energy-transferring contact with the sphere and a turntable 7. Turntable 7, arranged horizontally in the rotation apparatus, comprises a separate motor 8 and is thus controllable separately and in timed fashion. The drive wheel likewise has a separate motor 8 and is likewise separately controllable thereby. Because the drive wheel is arranged vertically in the rotation apparatus on the horizontal turntable 7, two force application directions for initiating rotary motion are transferred simultaneously to the sphere's surface, the result being that the sphere executes a plurality of rotation directions. If the turntable is controlled in timed fashion, this effect and the number of changes in rotation direction can be increased.

Advantageously, in order to ensure positioning and size adaptation to spherical receiving apparatuses of different sizes, the support and guidance stands are arranged modifiably with regard to their positioning.

Receiving apparatus 1, embodied as a sphere, has a separating plane 2. The sphere is held closed during the rotation process by means of closing apparatuses 11 that are advantageously embodied as a magnetic closure system.

Arranged in each of the two spherical segments formed by separating plane 2 is filling and shaping substance 10, in which a receiving region is shaped for the placement of negative mold 4 or of an interchangeable insert 3 as shown in FIG. 4.

Either negative mold 4 having the molding material can be arranged directly in filling and shaping substance 10, or the negative molds and the molding material are received in an interchangeable insert. The individual negative molds 4 are each arranged in the region of separating plane 2 in filling and shaping substance 10, at least on one side and likewise separated in terms of their shape by at least one separating plane 2.

Interchangeable insert 3 and/or negative molds 4 are arranged in sphere 1 in the correspondingly shaped recesses, and the sphere is closed.

It is also possible for filling and shaping substance 10 itself to constitute, as a "lost" shell, the spherical receiving apparatus 1, and for negative mold 4 having the molding material, or interchangeable insert 3 having negative mold 4 and the molding material, to be arranged in it.

The negative mold or interchangeable insert can be incorporated and positioned concurrently upon manufacture of receiving apparatus 1 from the filling and shaping substance, or the negative mold can be machined out subsequently using a laser sintering method, the molding material can be introduced, and the sphere can be closed. This receiving apparatus must, however, be destroyed in order to remove the completed molded parts.

The sphere is positioned in the holding apparatus on support and guidance element 5 between guidance mounts 6, and the rotation process can begin.

After the rotation process, the sphere can be opened on the guidance stands and repopulated either with interchangeable inserts 3 or with negative molds 4 having molding material.

With suitable delivery of external heat, this apparatus can also be used for hot rotation.

This inventive apparatus has created a solution with which rotationally molded objects can be economically manufactured in energy-saving fashion. Thanks to the implementation of a comprehensive change in the direction of the rotary motion of the sphere, a high level of quality for the shaped objects is achieved. One substantial advantage is the fact that with this solution, customer desires, new shapes, and extras can be reacted to quickly and without complication. Mold changes can be made quickly and without complication, and all preparation actions can be performed outside the rotation process, thereby achieving a high level of time saving in the context of production.

Specific adaptations in terms of material and shape can be arrived at thanks for the various adjustment possibilities, for example rotation speed, drive wheel rotation direction.

Once the rotation operation is complete (dimensional stability achieved), the receiving apparatus can be removed and a new, populated receiving apparatus can be associated with the holding apparatus. Receiving apparatus 1, as well as the negative molds, can be reused for further rotational molding operations.

Exemplifying Embodiment 2

In accordance with FIG. 3, receiving apparatus 1 is likewise made up of a sphere for receiving negative molds 4 or interchangeable inserts 3 having corresponding arrangements of negative molds 3. The holding apparatus for receiving the spherical receiving apparatus 1 is embodied as a shell-shaped holding apparatus 12, and its shell arc diameter corresponds approximately to the curvature of the spherical surface. A separating and guiding medium 13 is arranged, by means of a controllable control nozzle 14, between the shell surface and the surface of the spherical receiving apparatus. Separating and guiding medium 13 and control nozzle 14 serve as a drive element 9 to initiate rotation of the sphere. Rotation direction modification, and the speed of the sphere's rotation, are regulated with the control nozzle.

Liquid and/or gaseous media of suitable consistency and layer thickness, such as water, oil, air, and other media, are used as a separating and guiding medium 13.

Receiving apparatus 1 can be embodied as in Exemplifying Embodiment 1, and can be utilized for the apparatus in its different variants.

By means of suitable sensors, the positioning of the sphere during rotation can be monitored and can be adjusted for opening the sphere.

This apparatus has created an elegant solution which offers the advantage that the comprehensive change in direction of the sphere, and its speed, can be regulated with only at least one control element.

Adaptation to various requirements of the rotational molding process can be established and regulated quickly and without complication via the control nozzle. Removal and repopulation can also occur here both while the sphere is resident in the holding apparatus or after removal of the sphere from the holding apparatus.

Exemplifying Embodiment 3

It is also possible to combine the advantages of Examples 1 and 2. This solution is made up of a spherical receiving apparatus 1 in accordance with FIG. 2, and can receive negative mold 4 both directly or via an interchangeable insert 3. The sphere is arranged floatingly in a tank filled with medium, in which context both the solution with guidance stands 5, 6 of Example 1 and the solution with receiving shell 12 can be utilized as a holding apparatus. Turntable 7 having a drive wheel can function as a drive element 9. It should advantageously, however, be arranged outside the medium and act in energy-transferring fashion on sphere 1 from above in order to bring about rotation. It is also possible, however, to impart rotary motion to the sphere by means of control nozzle 14 below sphere receptacle 5, 6, or 12 and arranged in the medium.

Separating plane 2 of sphere 1 is embodied sealingly with respect to penetration of the medium.

This solution has the crucial advantage that the sphere floats in the medium and is thus very easy to move. The result of this is that an enormous energy saving can be realized.

LIST OF REFERENCE CHARACTERS

1 Receiving apparatus for negative molds
2 Separating plane of receiving apparatus
3 Interchangeable insert for negative molds
4 Negative mold
5 Support and guidance elements
6 Guidance mounts
7 Driven turntable
8 Motor drive
9 Drive element
10 Filling and shaping substance in receiving apparatus
11 Closure apparatus
12 Shell-shaped holding apparatus
13 Separating and guiding medium
14 Control nozzle

What is claimed is:

1. A rotation apparatus for rotationally molded shaped objects, the rotation apparatus comprising:
  a receiving apparatus for receiving at least one negative mold, wherein the receiving apparatus is a sphere;
  a holding apparatus for holding the receiving apparatus, wherein the holding apparatus includes a plurality of support and guidance elements each having a respective guidance mount in contact with the sphere to hold the sphere in location and allow the sphere to rotate in any direction; and a drive unit for driving rotary motion of the receiving apparatus, wherein the drive unit includes a drive wheel in rotation-transmitting contact with the receiving apparatus, a horizontal turntable on which the drive wheel is arranged, a first motor operable to rotate the turntable about a vertical axis, and a second motor operable to rotate the drive wheel about a drive wheel axis to cause the sphere to rotate, whereby a direction of rotation of the sphere caused by operation of the second motor is changed by operation of the first motor.

2. The rotation apparatus according to claim 1, wherein the holding apparatus includes at least three vertically extending support and guidance elements, each support and guidance element having a respective guidance mount.

3. The rotation apparatus according to claim 2, wherein the guidance mounts are rolling bearings movable about all axes.

4. The rotation apparatus according to claim 2, wherein the support and guidance elements are adjustable to change the positioning of the respective guidance mounts, whereby the holding apparatus is adjustable to hold receiving apparatus spheres of different sizes.

5. The rotation apparatus according to claim 1, wherein the receiving apparatus sphere comprises at least one separating plane.

6. The rotation apparatus according to claim 5, wherein at least one negative mold is arranged in a region of the separating plane in a filling and shaping substance provided in the spherical receiving apparatus.

7. The rotation apparatus according to claim 1, wherein a filling and shaping substance forms the receiving apparatus sphere, and the at least one negative mold is arranged in the filling and shaping substance.

8. The rotation apparatus according to claim 1, wherein the at least one negative mold is placed as an interchangeable insert into the receiving apparatus sphere.

9. A rotation apparatus for rotationally molded shaped objects, the rotation apparatus comprising:

a receiving apparatus for receiving at least one negative mold, wherein the receiving apparatus is a sphere;

a shell-shaped apparatus in which the sphere is received;

at least one control nozzle; and a separating and guiding medium placed under pressure, the separating and guiding medium being introduced by the at least one control nozzle between a surface of the shell-shaped apparatus and a surface of the receiving apparatus sphere to cause the sphere to rotate;

wherein a direction of rotation of the sphere is modified by the control nozzle, and the sphere is held at a fixed spatial location by the shell-shaped apparatus and the separating and guiding medium while the sphere rotates.

10. The rotation apparatus according to claim 9, wherein the separating and guiding medium is a gaseous medium or a liquid medium.

11. A rotation apparatus for rotationally molded shaped objects, the rotation apparatus comprising:

a receiving apparatus for receiving at least one negative mold, wherein the receiving apparatus is a sphere;

a holding apparatus for holding the receiving apparatus, wherein the holding apparatus includes a plurality of support and guidance elements each having a respective rolling bearing in contact with the sphere to hold the sphere in location but allow the sphere to rotate about any axis of rotation; and a drive unit for driving rotary motion of the receiving apparatus, wherein the drive unit includes a drive element in rotation-transmitting contact with the receiving apparatus, a turntable on which the drive element is mounted, a first motor operable to rotate the turntable about a first axis, and a second motor operable to rotate the drive element about a second axis;

wherein the second motor rotates the drive element about the second axis to cause the sphere to rotate, and the first motor rotates the turntable about the first axis to change the orientation of the second axis relative to the sphere, thereby changing a direction of rotation of the sphere.

* * * * *